(12) United States Patent
Bailis et al.

(10) Patent No.: US 6,307,925 B1
(45) Date of Patent: Oct. 23, 2001

(54) USE OF WIZARDS/EXPERTS IN A PBX ENVIRONMENT

(75) Inventors: Jason Mansfield Bailis; Karen Marie Bell, both of Novato; Terry Gregory Svetz, Kenwood; Allen Lee Jackson, Penngrove; Robert Alan Kaplan, Kensington, all of CA (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 08/630,626

(22) Filed: Apr. 10, 1996

(51) Int. Cl.[7] .................... H04M 15/00; H04M 1/24; H04M 1/66
(52) U.S. Cl. ................. 379/136; 379/1; 379/32; 379/112; 379/199
(58) Field of Search ................. 379/136, 94, 96, 379/97, 93, 201, 207, 159, 266, 121, 199, 1, 32, 202, 34, 247, 93.17, 93.21, 93.23; 395/159, 160, 161, 500; 364/200, 478, 451

(56) References Cited

U.S. PATENT DOCUMENTS

| | | | |
|---|---|---|---|
| 4,197,427 | * | 4/1980 | Hutcheson et al. . |
| 4,464,543 | * | 8/1984 | Kline et al. ............ 379/247 |
| 4,556,954 | | 12/1985 | Advani et al. . |
| 4,648,044 | * | 3/1987 | Hardy et al. ............ 364/513 |
| 4,654,852 | | 3/1987 | Bentley et al. . |
| 4,675,147 | | 6/1987 | Schaefer et al. . |
| 4,866,763 | * | 9/1989 | Cooper et al. ............ 379/221 |
| 4,881,230 | * | 11/1989 | Clark et al. ............ 371/20.1 |
| 5,095,500 | * | 3/1992 | Tayloe et al. ............ 379/32 |
| 5,101,425 | * | 3/1992 | Darland et al. ............ 379/34 |
| 5,202,985 | | 4/1993 | Goyal . |
| 5,241,482 | | 8/1993 | Iida et al. . |
| 5,247,651 | * | 9/1993 | Clarisse ............ 395/500 |
| 5,270,919 | * | 12/1993 | Black et al. ............ 364/401 |
| 5,291,492 | * | 3/1994 | Andrews et al. ............ 370/259 |
| 5,309,509 | * | 5/1994 | Cocklin et al. ............ 379/165 |
| 5,353,399 | | 10/1994 | Kuwamoto et al. . |
| 5,355,307 | | 10/1994 | Scharnhorst . |
| 5,400,246 | | 3/1995 | Wilson et al. . |
| 5,416,825 | * | 5/1995 | Renger et al. ............ 379/1 |
| 5,442,549 | | 8/1995 | Larson . |
| 5,442,759 | | 8/1995 | Chiang et al. . |
| 5,455,854 | * | 10/1995 | Dilts et al. ............ 379/94 |
| 5,461,560 | | 10/1995 | Uribe . |
| 5,533,110 | * | 7/1996 | Pinard et al. ............ 379/201 |
| 5,546,449 | * | 8/1996 | Hogan et al. ............ 379/203 |
| 5,631,954 | * | 5/1997 | Evans et al. ............ 379/93.17 |
| 5,727,057 | * | 3/1998 | Emery et al. ............ 379/16 |
| 5,778,049 | * | 7/1998 | Young et al. ............ 379/10 |
| 5,923,729 | * | 7/1999 | Dezonno ............ 379/1 |

* cited by examiner

Primary Examiner—Binh K. Tieu
(74) Attorney, Agent, or Firm—Carter, Ledyard & Milburn

(57) ABSTRACT

Telecommunication equipment is connected to and controlled by a computer which executes software controlling the digital communication between the telecommunication equipment and the computer. Software in the form of a wizard or expert also executes on the computer and acts to simplify the computer user's interaction with the telecommunication equipment and underlying software which controls the telecommunication equipment.

11 Claims, 4 Drawing Sheets

USE OF WIZARDS/EXPERTS IN A PBX ENVIRONMENT

BACKGROUND OF THE INVENTION

The present invention relates to software programs used in telecommunication settings. The invention involves application programs which facilitate use of other telecommunication-based computer programs and telecommunication systems themselves. These types of programs are highly application specific and assist a user by performing repetitive or tedious tasks, querying the telecommunication system under program control, or querying the user as to desired results.

The general nature of such a software construct is well known. They are sometimes referred to as experts or wizards and appear in application programs as well as operating systems. While the general notion of such a program is not novel, its application to the area of telecommunication software in the following areas is not believed to be known.

In one aspect, the present invention first addresses a wizard which simplifies the use of existing software. Existing systems include personal computer (PC) application programs which allow a user to view a digital telephone as a virtual phone and customize the look and features of a virtual phone through such a program. Such systems in the prior art are often confusing and tedious to some users. Because of this, the present invention provides a software method of simplifying this process for the user in a telecommunications environment.

In another aspect of the present invention, a wizard may be constructed using software which allows a user to view and manage a telephone conference network. Typically, the tasks of managing a telephone conference network includes the steps of: (1) establishing the current state of the network; and, (2) constructing node/conference pairs to perform the required conference functions. In the prior art, these tasks are often difficult or time consuming for a user. For this reason, the present invention provides a wizard which simplifies this task for the user. At present, there exists no such facility to simplify a user's performance of this task.

In another aspect, the present invention may also provide wizards to perform editor functions for the user in the context of telecommunication applications. In this aspect, the wizards perform such basic administration tasks as adds, moves and changes, which would otherwise involve repetitive transactions with telecommunication software. Further, the present invention can provide maintenance or diagnostic assistance by querying the user as to symptoms and suggesting solutions for a telecommunication system. Additionally, the present invention may include wizard software constructs to provide a software method of viewing data in a manner most convenient and understandable to a user. Such a wizard may give a user options as to the means to view data, such as bar graphs, pie charts, etc. The wizard may then display the data in such a fashion for the user. Without the present invention, the user is often left to perform these tasks manually and without assistance.

Finally, in still another aspect of the present invention, the present invention may include components which assist a user in maintaining a telecommunication system and in determining the user's telecommunication needs. Such a wizard may query a user for information concerning the telecommunication system and use the user-provided answers as well as information relating to the current telecommunication system to determine the architecture and/or features of an improved telecommunication system to meet the needs of a user.

Generally, the prior art in the area of automated assistance discloses the use of software constructs which generally provide services to a user similar to assisting in the performance of computer-related tasks. However, the prior art generally does not address the unique and specific requirements of telecommunication software and systems.

Accordingly, it is an object of the present invention to provide a novel system and method of assisting a telecommunication administrator or terminal user with use of computer based management software by querying the user as to desired actions and performing these actions for the user.

It is another object of the present invention to provide a novel system and method of assisting a telecommunication administrator with use of computer based management software by determining the status of parts of the telecommunications system and reporting this status to the user in a way that is easier for the user to perform than by directly using the management software itself.

It is yet another object of the present invention to provide a novel system and method of assisting a telecommunication administrator with use of computer based management software by determining the status of parts of the telecommunications system, reporting this status to the user and performing actions on the telecommunications system at the user's request in a way that is easier for the user to perform than by directly using the management software itself.

It is still another object of the present invention to provide a novel system and method of assisting a computer user with management of a computer based system by querying the user as to telecommunication system needs and providing information to the user as to how best to meet those needs with currently owned or yet to be acquired and or configured telecommunication equipment.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

A wizard in a telecommunications environment may take a number of forms and assist the system user in a variety of ways. All of the types discussed here have the effect of simplifying the use of a telecommunications system which uses a computer interface.

One such wizard functions in an environment which includes a virtual phone. Such a virtual phone is initiated by use of PC software such as Harris' Optic PC which works with a Harris digital telephone system. This software creates a representation of a Harris digital phone to which it is attached. Through this representation, a user can customize the look and features of the virtual phone more easily than through use of the phone itself.

One feature of this software is the flexibility it provides the user as to the layout of the buttons and controls as they appear on the real phone. This customization process may be difficult for the user. This difficulty is remedied through use of a wizard which works between the user and the underlying software.

Figure 1:
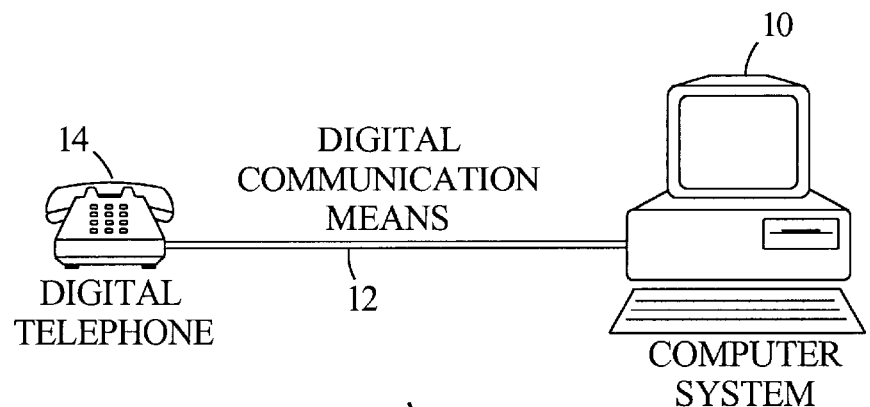
FIG. 1 is a high level representation of a system in which the system and method of the present invention may be used.

With reference to FIG. 1, one aspect of the present invention may be used in a computer system 10 which is tied through a digital communications means 12 to a digital telephone 14. Through the digital communication means 12, the computer system 10 controls the operation of the digital telephone 12, all of which may be under the control of software. The digital telephone may be a Harris digital telephone and the computer system may be a Harris Optic PC.

A wizard operating on such a system is accessible by the user while executing the software in the computer system 10. In operation, the wizard may follow the general steps shown in FIG. 4, which shows the execution flow of a wizard which performs tasks for a user which a user often finds difficult.

Figure 4:
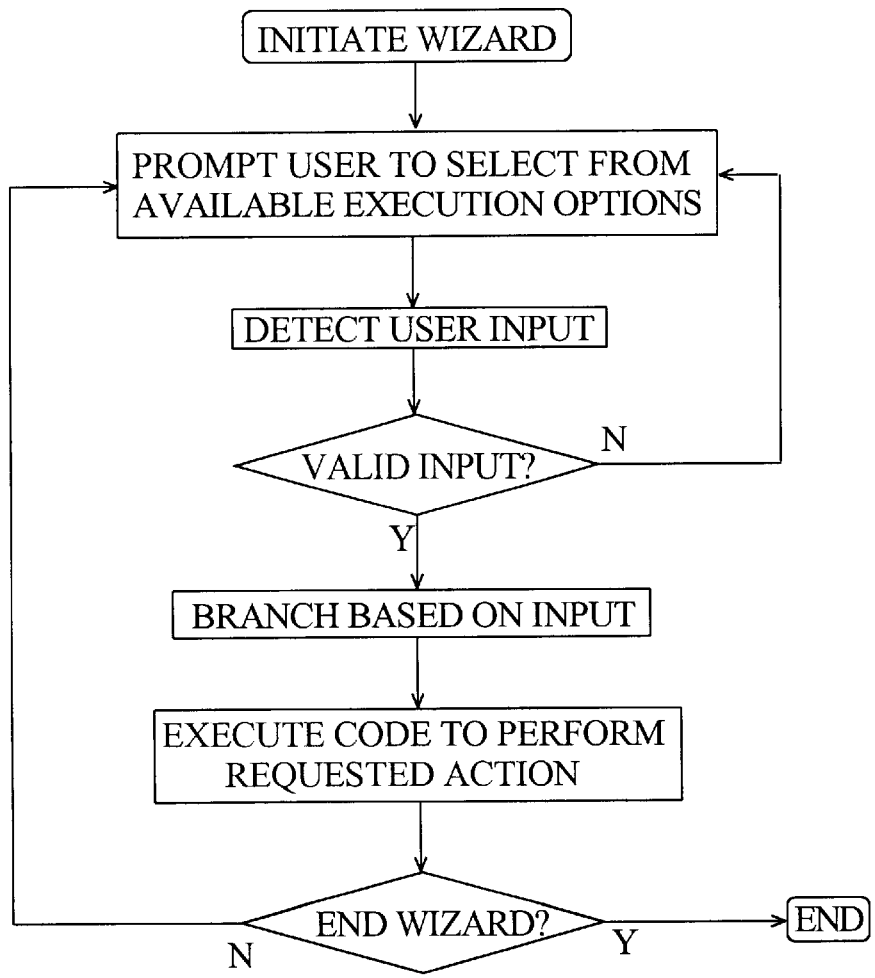
FIG. 4 is a high level flow chart illustrating a sequence of steps which may be utilized in performing one of the aspects of the method of the present invention by a wizard which performs the function of interfacing with another program.

With reference to FIGS. 1 and 4, a wizard of the present invention may first prompt the user as to the available execution options. For example, and as shown in the flow chart of FIG. 4, the options may include the various buttons and controls of the phone, the available functions of the telephone system, the mutual mapping between the buttons and the functions. The wizard may ask the user which functions and/or controls are desired to be altered. Once the user has made a selection through use of an input device such as a keyboard or pointing device, the wizard detects this input and alters its execution flow accordingly. The software executed by the wizard will generally be based on the user input and interacts with the control software of the computer system 10 to make the desired alterations to the virtual phone.

After completing the execution of the requested function, the wizard may return to the main menu of options and repeat this sequence until the user chooses to end the wizard. Upon receiving an invalid response from the user while waiting for a selection, the wizard may indicate to the user the nature of the error and once again prompt the user for a valid input, possibly offering suggestions based on the erroneous entry.

In a variation on this embodiment, a wizard may go through an automated sequence of steps which walk the user through a series of questions, instead of the discrete menu based tasks as described above.

Another wizard for use in a telecommunications environment may operate as a front end for a telecommunications product called Network Conference Manager (NCM). NCM is a PC application which allows an administrator to view and manage a network of large telephone conferences. One of the steps in using NCM is creating a view of the network and constructing queries of node/conference pairs. Conventionally, using this software for this purpose can be difficult for an administrator.

Figure 2:
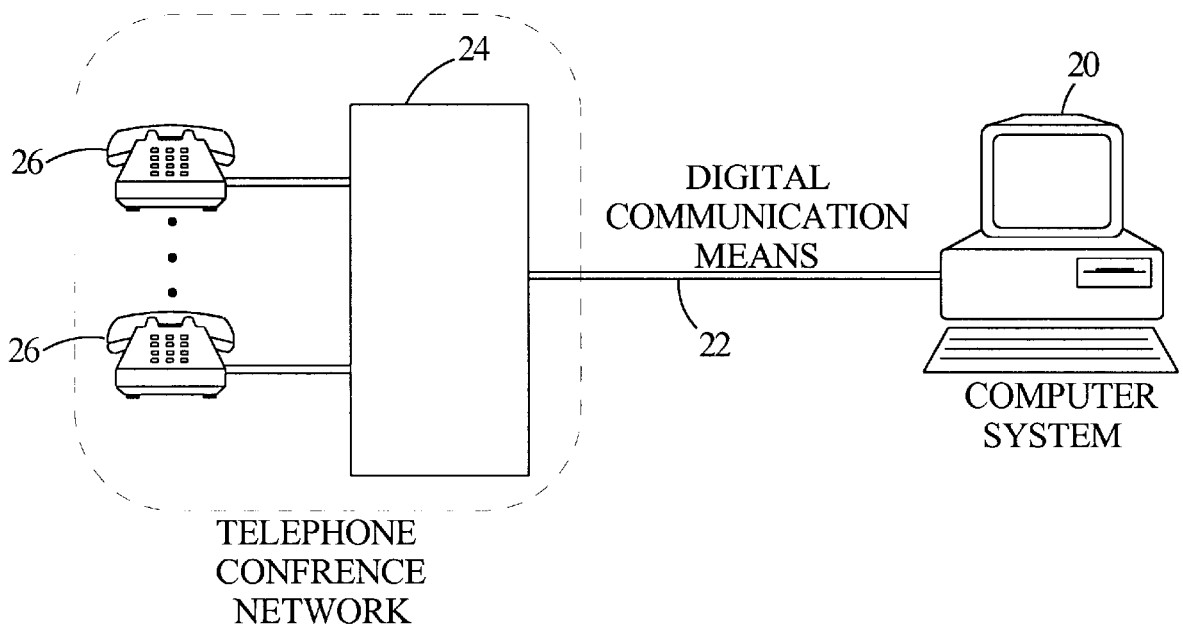
FIG. 2 is a high level representation of another system in which the system and method of the present invention may be used to simplify a telecommunication system user's manipulation of the software which acquires information about a telephone network and builds the appropriate connections to create large telephone conferences.

In a system of the present invention, a wizard may act to lessen the difficulties faced by an administrator in an analogous method to that used in the system and method of FIG. 4, explained above. With reference now to FIG. 2, a second embodiment of the present invention could be utilized in a telecommunication system comprising a computer system 20 attached through a digital communication means 22 to a switch 24 which is connected to plural telephones 26. The telephones 26 may be connected by the switch 24 into a common telephone path or "conferenced" together. In the telecommunication system of FIG. 2, the connections between the switch 24 and each of the telephones 26 may include many conventional switching and connection paths (such as central offices), which are not shown for simplicity.

In operation, with continued reference to FIG. 4., the computer system 20 may execute NCM software which it uses to control the functioning of the switch 24 to operate as a telephone conference network. While only a single switch is depicted, plural of such switches 24 may be used to provide the conferencing capability and the switches 24 do not have to be co-located but may be managed remotely by the computer system 20 through conventional remote control means.

Figure 5:
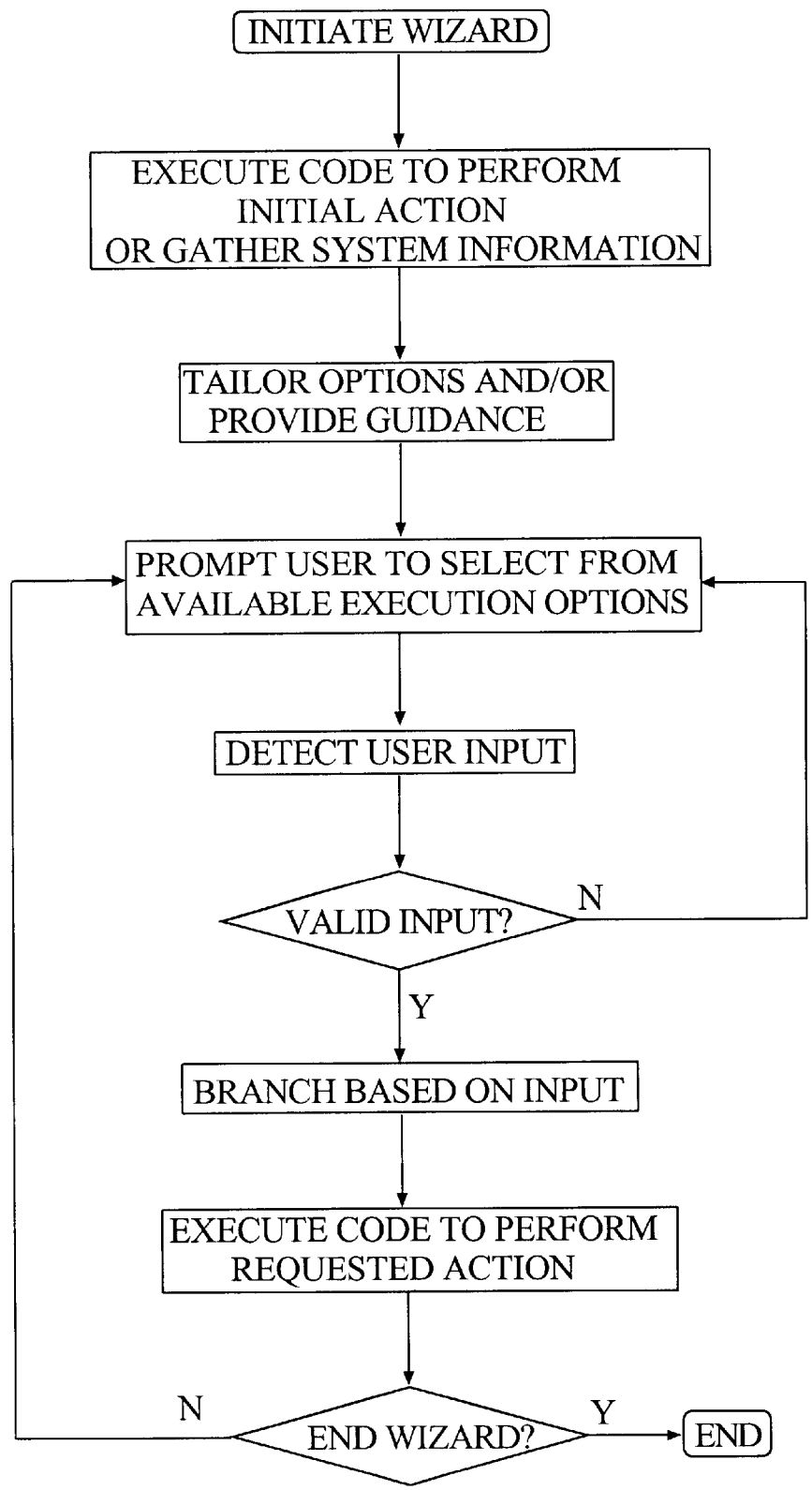
FIG. 5 is a high level flow chart which shows the general sequence of steps which may be utilized in performing another aspect of the method of the present invention by a wizard which generally performs the function of simplifying a user's use of a telecommunication system.

In a system of the present invention, an administrator desiring to use the NCM programming to create or alter a conference network is given the option of invoking a wizard for assistance. With reference to FIG. 2 and FIG. 5, the wizard could follow an execution flow in which the wizard performs an initial action of gathering information concerning the network. Generally, this information may concern the various node/conference pair creation options available to the user. Upon determination of the options, the system of the present invention may display the permissible options and seek a selection from the user of a selected option. If needed or desired, the present method may also assist the user in his selection by providing guidance to the user along with the options. For example, the system may provide a costing associated with each available node/conference pair. Similarly, the guidance can be in the form of a history of reliability associated with various pairs or an indication of other traffic density at or near particular nodes. Whatever guidance may be implemented in a particular wizard of the present invention, the user ultimately may make a selection (or instruct the computer system to make a selection based on a particular criteria) and the computer system 20 sends the appropriate signals to the switches 26 to establish the selected conference configuration. Through the use of this aspect of the present invention, the user is afforded a method of using NCM with a greatly simplified front end.

In another aspect of the present invention, another type of wizard simplifies editor functions for a telecommunications switch user. Generally, all telecommunication switches require configuration. In the prior art, various computer programs are available to run on a computer attached to a switch in a telecommunication system to configure a switch as needed. These programs usually allow the user to interact through either a textual or graphic interface. In another aspect of the present invention, a wizard can be used in conjunction with this conventional software to improve a user's ease of use and overall productivity.

Figure 3:
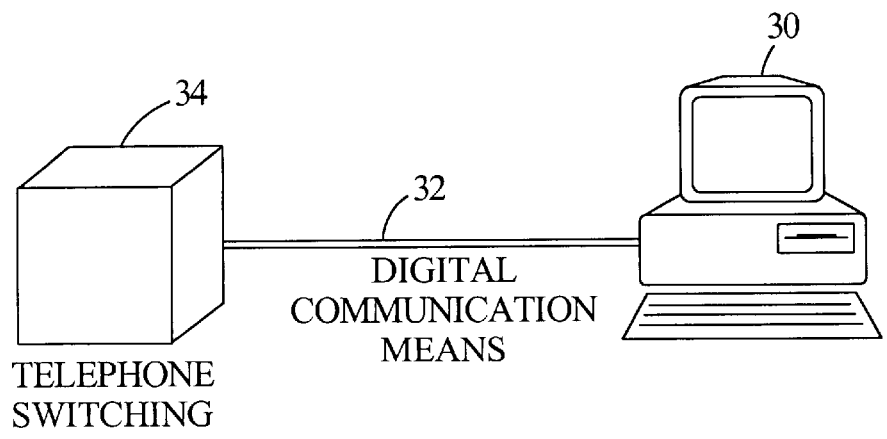
FIG. 3 is a high level representation of a system of the present invention which is capable of executing a number of different types of wizards in a telecommunication environment.

With reference now to FIG. 3, another aspect of the present invention may operate on a system in which a computer 30 on which the switch-managing software executes is attached through digital communication means 32 to a telecommunication switch 34. Through this digital connection, the computer system 30 controls the configuration of the switch 34 under the control of the switch-managing software operating within the computer system 30. In this aspect of the present invention, a method of the present invention may operate in conjunction with the switch-managing software to control the switch 34 and provide information to an operator with an interface that is much easier for the operator to use.

The execution flow of a wizard may depend on the action being performed by the wizard. A wizard which performs basic administration tasks, such as adds, moves and changes to the data that define the parameters of switch operation may follow an execution flow as the flow shown in the flow diagram of FIG. 4. In such a flow, the user is prompted as to which of the basic administration tasks he wishes to perform and the code that is executed based on that decision interacts with the switch management software to perform the desired task.

Figure 6:
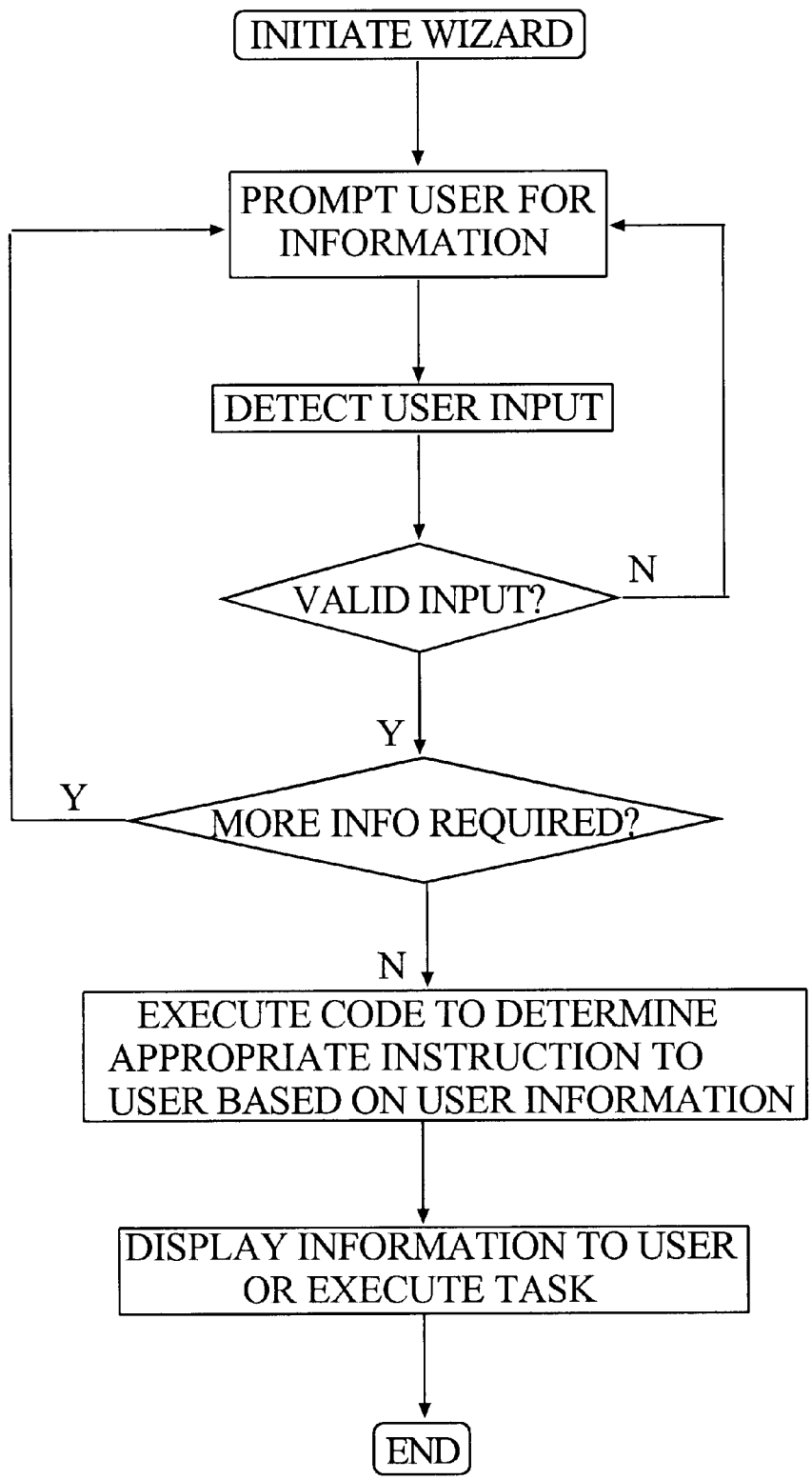
FIG. 6 is a high level flow chart which shows the general sequence of steps which may be utilized in performing another aspect of the method of the present invention by a wizard which generally performs the function of assisting a telecommunication system user's management of a telecommunication system.

In another aspect, the present invention may work with switch management software to perform maintenance and problem diagnosis. In such an aspect, the method may follow an execution path as shown in the flow diagram of FIG. 6. In such a flow, the user may be prompted for information which relates to the symptoms of the perceived problem. The wizard of the present invention follows an execution path based on the user's input, which might include prompting the user for more information. After some number of such iterations, the wizard reports a suggested action to be taken by the user. In the case of this wizard, there may be no action taken to in any way alter the condition of the telecommunication hardware connected to the computer. The result is merely a presentation of information to the user or a recommendation for the user to take some further action.

In another aspect of the present invention, another method may utilize a wizard that performs an editor function to perform data presentation for the user. In this aspect, the wizard may follow an execution path such as shown in the flow diagram of FIG. 5. In such a flow, the user may be prompted to choose a presentation method for data, such as pie chart, bar graph, etc. Based on the selection of the user, the wizard may execute code which displays the data to the user in the requested manner. The data operated on would most likely be data pertaining to switch operation, perhaps gathered by another wizard.

Still another aspect of the present invention may include a wizard which executes on a computer system which is connected to any type of telecommunication equipment and performs advanced administration tasks. In this capacity, the method of the present invention may follow execution paths such as shown in the flow diagram of FIG. 6. In one instance, the wizard may perform diagnostic functions similar to those discussed above. In contrast, however, the reason for executing the wizard is not to fix a problem, but to note the user's telecommunication needs and suggest the best way for the user to meet those needs. In this capacity, the wizard actually functions as a marketing tool, apprising the user of available equipment and services, and may contact the marketer/manufacturer on behalf of the user.

Alternately, the wizard queries the user as above, but instead of assessing needs and suggesting ways of meeting them, the wizard performs routine maintenance on the telecommunication equipment.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A computer implemented method for providing assistance to a customer of a computer application which allows a customer to perform maintenance functions on a telecommunication system or analyze telecommunications needs, said method comprising the steps of:

(a) determining what maintenance/assessment functions are available to be performed on the telecommunication system;

(b) prompting a customer as to the maintenance/assessment functions that are available;

(c) querying the customer as to which one or more of the functions the customer has chosen to perform; and (d) executing the chosen function.

2. An apparatus for computer control of some or all of the functions of a digital telephone, said apparatus comprising:

(a) a digital telephone;

(b) a computer system, said computer system connected via a means for digital signal communications to a control port of said digital telephone;

(c) a first application program element, said first application program element executed by said computer system and providing information to a customer through display means, said first application program element also monitoring customer input through one or more input means and for commanding the execution of a task at said digital telephone where a plural series of customer inputs at the computer system selects the task for execution; and (d) a second application program element, said second application program element providing a means for simplifying the selection of the task by querying the customer as to what are the customer's requirements as to the task so that the plural series of customer inputs that selects the task for execution is reduced.

3. An apparatus for computer control and monitoring of some or all of the functions of a network of telephone conferences, said apparatus comprising:

(a) a network of telephone conferences;

(b) a computer system, said computer system connected via a means for digital signal communications to a control port of said network of telephone conferences;

(c) a first application program element, said application program executed by said computer system to provide information to a customer through display means, said application program also monitoring customer input through one or more input means and for commanding the execution of a task at said network of telephone conferences where a plural series of customer inputs at the computer system selects the task for execution;

(d) a second application program element said second application program element providing a means for simplifying the selection of the task by querying the customer as to what are the customer's requirements as to the task so that the plural series of customer inputs that selects the task for execution is reduced.

4. An apparatus for computer control and monitoring of some or all of the functions of telephone switching equipment, said apparatus comprising:

(a) a telecommunications switch;

(b) a computer system, said computer system connected via a means for digital signal communications to a control port of said telecommunications switch;

(c) a first application program element, said application program executed by said computer system to provide information to a customer through display means, said application program also monitoring customer input through one or more input means and for commanding the execution of a task at said telecommunications switch where a plural series of customer inputs at the computer system selects the task for execution;

(d) a second application program element, said second application program element providing a means for simplifying the selection of the task by querying the customer as to what are the customer's requirements as to the task so that the plural series of customer inputs that selects the task for execution is reduced.

5. The apparatus of claim 4 wherein said first and second application program elements control switching equipment administration functions, such as adds, moves and changes to switching equipment data.

6. An apparatus for computer maintenance of the functions of telephone switching equipment, said apparatus comprising:

(a) a telephone switch;

(b) a computer system, said computer system connected via a means for digital signal communications to a control port of said telephone switch;

(c) a first application program element, said application program executed by said computer system to assist a customer in maintaining telephone switching equipment, said application program also providing information to the customer through display means, said application program also monitoring the customer's input through one or more input means and providing information to the customer based in part on the user customer;

(d) a second application program element, said second application program element providing a means to simplify the customer's access to the information by providing the information through reduced input from the customer than would be required by said first application program element, said second application program element querying the user to determine telecommunication requirements of the customer.

7. The apparatus of claim 6 wherein the information pertains to diagnosing problems with said telephone switch.

8. The apparatus of claim 6 wherein the information pertains to the manipulation and presentation of data concerning said telephone switch.

9. An apparatus for computer maintenance of the functions of telephone equipment, said apparatus comprising:

(a) telephone equipment;

(b) a computer system, said computer system connected via a means for digital signal communications to a control port of said telephone equipment;

(c) a first application program element, said application program executed by said computer system to assist a customer in maintaining telephone equipment, said application program also providing information to the customer through display means, said application program also monitoring the customer's input through one or more input means and providing information to the customer based in part on the customer input;

(d) a second application program element, said second application program element providing a means to simplify the customer's access to the information by providing the information through reduced input from the customer than would be required by said first application program element, said second application program element querying the user to determine telecommunication requirements of the customer.

10. A computer implemented method for assisting a customer in using a control application program for controlling a telecommunications apparatus comprising the steps of:

(a) providing a control application program for controlling a telecommunications apparatus;

(b) initiating in response to customer input an expert application program for operating the control application program;

(c) determining actions which are available on the telecommunication apparatus;

(d) querying the customer regarding the available actions;

(e) detecting an available action selected by the customer; and (f) in response to detecting a selected action, initiating operations of the control application program by the expert application program to execute the selected action on the telecommunications apparatus.

11. A device for controlling a telecommunications apparatus comprising:

a telecommunications apparatus adapted to connect to a telecommunications network for executing a plurality of telecommunication actions;

a computer system having a connection to a control port of said telecommunications apparatus for providing digital signal communications between said telecommunications apparatus and said computer system;

a first application program executed on said computer system for controlling digital signal communications with said telecommunications apparatus and for commanding said telecommunications apparatus to execute at least one of the plurality of telecommunication actions in response to customer input; and a second application program executed on said computer system for determining actions available on said telecommunications apparatus, for controlling said first application program, and for reducing customer input by querying the customer as to what are the customer's requirements as to the execution of an action that has been selected, whereby the second application program controls the first application program with reduced customer input to execute a telecommunications action.

* * * * *